US008930753B2

(12) United States Patent
Hillman et al.

(10) Patent No.: US 8,930,753 B2
(45) Date of Patent: Jan. 6, 2015

(54) SYSTEM, METHOD AND APPARATUS FOR ERROR CORRECTION IN MULTI-PROCESSOR SYSTEMS

(75) Inventors: Robert Hillman, Poway, CA (US); Gale Williamson, San Diego, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 13 days.

(21) Appl. No.: 13/284,647

(22) Filed: Oct. 28, 2011

(65) Prior Publication Data

US 2012/0117419 A1    May 10, 2012

Related U.S. Application Data

(60) Provisional application No. 61/407,770, filed on Oct. 28, 2010.

(51) Int. Cl.
| | |
|---|---|
| G06F 11/00 | (2006.01) |
| G06F 11/07 | (2006.01) |
| G06F 11/16 | (2006.01) |
| G06F 11/18 | (2006.01) |

(52) U.S. Cl.
CPC .......... *G06F 11/073* (2013.01); *G06F 11/0763* (2013.01); *G06F 11/1658* (2013.01); *G06F 11/184* (2013.01); *G06F 11/0724* (2013.01); *G06F 2201/83* (2013.01)
USPC .................................. 714/12; 714/10; 714/11

(58) Field of Classification Search
USPC ................................. 714/10–13, 42
See application file for complete search history.

(56) References Cited

U.S. PATENT DOCUMENTS

| | | | |
|---|---|---|---|
| 4,414,624 A | 11/1983 | Summer et al. | |
| 5,189,647 A | 2/1993 | Suzuki et al. | |
| 5,630,148 A | 5/1997 | Norris | |
| 5,956,474 A | 9/1999 | Bissett et al. | |
| 6,247,143 B1 * | 6/2001 | Williams | 714/11 |
| 6,751,749 B2 * | 6/2004 | Hofstee et al. | 714/11 |
| 6,834,354 B1 | 12/2004 | Togawa | |
| 6,938,183 B2 * | 8/2005 | Bickel | 714/12 |
| 6,986,068 B2 | 1/2006 | Togawa | |
| 7,310,759 B1 * | 12/2007 | Carmichael et al. | 714/725 |
| 7,515,996 B2 | 4/2009 | Wald | |

(Continued)

OTHER PUBLICATIONS

Notification of Transmittal of the International Search Report and Written Opinion issued in Corresponding International Patent Application No. PCT/US2011/58394 on Mar. 16, 2012.

(Continued)

*Primary Examiner* — Philip Guyton
(74) *Attorney, Agent, or Firm* — Knobbe Martens Olson & Bear LLP

(57) ABSTRACT

This disclosure provides apparatus, methods and systems for error correction in multi processor systems. Some implementations include a plurality of computing modules, each computing module including a processor. Each processor may include processing state. In some other implementations, each computing module may also include a memory. Upon receiving a signal to perform a partial re-synchronization, a hash of each processor's state data may be performed. In some embodiments, a hash of at least a portion of each computing module's memory data may also be performed. The hashes for each processor are then compared to determine majority hashes and possible minority hashes. Upon identifying a minority hash, the computing module that produced the minority hash may receive new processing state data from one of the computing modules that produced a majority hash.

30 Claims, 10 Drawing Sheets

(56) References Cited

U.S. PATENT DOCUMENTS

| | | | |
|---|---|---|---|
| 7,589,558 B1* | 9/2009 | Tseng et al. | 326/41 |
| 7,797,575 B2* | 9/2010 | Clark et al. | 714/11 |
| 7,996,714 B2* | 8/2011 | O'Connell et al. | 714/12 |
| 8,117,512 B2* | 2/2012 | Sorensen et al. | 714/733 |
| 8,140,893 B2* | 3/2012 | Niino | 714/11 |
| 2004/0030966 A1 | 2/2004 | Spieker et al. | |
| 2004/0073822 A1 | 4/2004 | Greco et al. | |
| 2004/0193735 A1 | 9/2004 | Peleska et al. | |
| 2005/0160312 A1* | 7/2005 | Seng et al. | 714/13 |
| 2006/0020850 A1* | 1/2006 | Jardine et al. | 714/11 |
| 2006/0020852 A1 | 1/2006 | Bernick et al. | |
| 2006/0236168 A1* | 10/2006 | Wolfe et al. | 714/724 |
| 2007/0052453 A1 | 3/2007 | Wald | |
| 2009/0327818 A1 | 12/2009 | Kogelnik | |
| 2011/0208997 A1* | 8/2011 | Czajkowski | 714/10 |

OTHER PUBLICATIONS

International Search Report and Written Opinion issued in International Application No. PCT/US2011/58394 on Mar. 16, 2012.

* cited by examiner

SYSTEM, METHOD AND APPARATUS FOR ERROR CORRECTION IN MULTI-PROCESSOR SYSTEMS

CROSS REFERENCE TO RELATED APPLICATIONS

This application claims priority to provisional patent application Ser. No. 61/407,770, filed Oct. 28, 2010 entitled "Self Correcting Computing with Partial Scrubbing/Re-sync", the contents of which are hereby incorporated by reference in their entirety.

TECHNICAL FIELD

This disclosure relates to error correction of devices with several computing modules. Specifically, this disclosure is related to error correction in a device including two or more processors. Some implementations also include multiple associated memory structures.

DESCRIPTION OF THE RELATED TECHNOLOGY

Certain environments require that computer systems be extremely reliable. At the same time, some of these environments may be extremely harsh, exposing computer components to potentially catastrophic elements.

One such environment is the space environment. Computer systems that may be placed in space, such as in Earth orbit, are not available for regular maintenance and must, therefore, be designed to perform for the lifetime of the spacecraft. Thus, a computer system mounted on a spacecraft must be highly reliable and robust in its tolerance to faults, either internal or external.

Further, objects placed in space are subject to various types of radiation that may be extremely harmful to certain computer components. For example, the sun can produce radiation elements that affect electronic systems. A single radiation element may cause an upset, referred to as a single event upset (SEU), of either a processor or a memory in a computer system by changing the state of the transistors within these computer components. A computer in the space environment should desirably be tolerant to such single event upsets because they happen frequently in space.

Developing computer components that are individually tolerant to such upsets can be extremely expensive and inefficient. Foremost, due to the long development cycles, such components generally lack the performance of the state of the art components. For example, a processor designed to be radiation tolerant may be two years old by the time the development is complete. In those two years, processors may have more than doubled in speed or throughput. Further, hardening such components against faults may make the components far more expensive than comparable components without the hardening.

One way to protect against SEUs is to use systems with multiple, redundant processors. For example, U.S. Pat. No. 5,903,717 discloses a computer system for detecting and correcting errors from SEUs. The system includes a plurality of processors (CPUs) whose outputs are voted at each clock cycle. Any CPU output signal which does not agree with a majority of the CPU output signals results in an error signal being produced. The system reacts to the error signals by generating a system management interrupt. In reaction to the system management interrupt resulting from a detected error, software in the system initiates a re-synchronization of the plurality of CPUs when the error is caused by a single event upset.

U.S. Pat. No. 7,467,326 discloses a computer system with a scrubbing module for re-synchronizing processors after a predetermined time interval or any other event that may be defined by a user. The scrubbing module improves the reliability of a system by scrubbing the components on a regular schedule, rather than waiting for an error to be detected. Thus, errors that may go undetected for an extended period are not allowed to propagate and further damage the system.

SUMMARY

The systems, methods and devices of the disclosure each have several innovative aspects, no single one of which is solely responsible for the desirable attributes disclosed herein.

The methods, apparatus, and systems described herein relate to computer systems that are robust in their tolerance to single-event effects that may be encountered, for example, in the space environment or by high-altitude aircraft. These methods, apparatus, and systems relate to a computer system that is provided with various sets of protections against failures that may be caused by space or solar radiation, for example. Such protections include one or more of the following: multiple processors, multiple memory modules, error detection and correction logic, and mechanical shielding of the system components. The methods, apparatus, and systems disclosed provided improved performance over prior art systems in a number of respects.

One innovative aspect of the subject matter described in this disclosure can be implemented in a method of synchronizing the state of a plurality of computing modules in an electronic system, each computing module having a processor. The method may include hashing processor state data for each of the plurality of computing modules, comparing the processor hashes for the processor state data, and re-synchronizing the plurality of computing modules based at least on the compared processor hashes.

Another innovative aspect of the subject matter described in this disclosure can be implemented as a fault tolerant computing apparatus. The fault tolerant computing apparatus may include a plurality of computing modules, wherein each computing module comprises a processor having processor state data, a hashing module configured to generate hash values of the processor state data, and a fault tolerant checking unit configured to receive the plurality of hash values and determine if each computing module is synchronized with the other computing modules.

The subject matter may also be implemented as a fault tolerant computing apparatus, including a plurality of computing modules, each computing module including a processor having processor state data, means for hashing configured to generate hash values of the processor state data, means for comparing the plurality of hash values, and means for determining if the processor within each computing module is synchronized with the processors of the other computing modules.

In some implementations, the subject matter of this disclosure may be implemented as a non-transitory, computer readable storage medium having instructions stored thereon that cause a processing circuit to perform a method. The method may include hashing processor state data for each of a plurality of computing modules, comparing the processor hashes for the processor state data, and re-synchronizing the plurality of computing modules based at least on the compared processor hashes.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
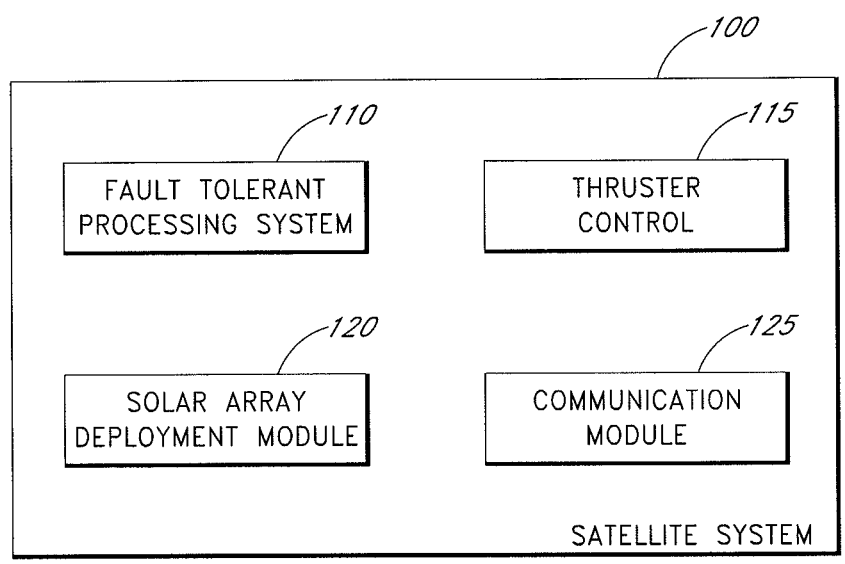
FIG. 1 illustrates a block diagram of one embodiment of a satellite that includes a fault tolerant computing apparatus.

The following description is directed to certain implementations for the purposes of describing the innovative aspects of this disclosure. However, a person having ordinary skill in the art will readily recognize that the teachings herein can be applied in a multitude of different ways. Thus, the teachings are not intended to be limited to the implementations depicted solely in the Figures, but instead have wide applicability as will be readily apparent to one having ordinary skill in the art.

One embodiment is a fault tolerant processing system having improved capacity and performance. The system maintains a high tolerance to errors, such as single-event upsets (SEUs) that may be encountered, for example, in the space environment or by high-altitude aircraft. In this embodiment, the fault tolerant processing system incorporates at least one processing module that acts to control and process data for the overall system. Each processing module is fault tolerant by inclusion of at least three computing modules that are configured to run in parallel with one another to prevent SEUs, but may include a larger number of computing modules to further improve the reliability of the system. In more embodiments, each computing module operates independently of, and in parallel with, the other computing modules.

While prior systems have employed systems with redundant components that can be re-synchronized, the performance of these prior art systems may be limited due to the nature of their synchronization. For example, prior art systems may have coupled a plurality of processors to a coherency controller that compared outputs of multiple synchronous processors to ensure fault tolerant operation. Because each of the plurality of processors in these systems was generally not hardened against the effects of SEUs, the coherency controller ensured that the processor's operations remained fault tolerant. This comparison of outputs may have been performed with every bus cycle, and may have compared signals on address or data lines associated with processors included in the computing modules. This process may have slowed operation of the processors because the bus speeds of the coherency controller may have been slower than the maximum bus speed of the processors.

Memory access for these prior art system may have also limited performance. In these systems, memory space for the processors may have been provided by a radiation hardened memory chip accessible to the processors via the coherency controller. In some cases, accessing the hardened memory via a coherency controller could slow the operation of the processors. In some systems, the bus speeds between the processors and the coherency controller may be slower than the maximum bus speeds supported by the processors. The hardened memory modules used in these systems may also have provided slower data access speeds, given that their custom, radiation hardened designs may have slowed their commercialization, causing them to be based on older memory designs.

Accordingly, some embodiments described herein improve device performance by reducing the reliance of each computing module on interaction with the coherency controller. For example, modern processors may be designed with multiple address and data buses. Using these modern processors, a first set of busses may be operatively coupled to a coherency controller, while a second set of busses may be coupled to other hardware components capable of operating at a higher bus speed. Processors may then perform certain operations not requiring strict coherency control using the second set of busses.

To provide for additional error detection and correction of the plurality of computing modules in this configuration, hashes of processor state may be performed in embodiments of the invention. The hashes of processor state may be compared, and the computing modules resynchronized based on the results of the comparison.

Some implementations described here improve memory performance of the system by providing each processor with a directly connected local memory for storing memory state or program data. In some embodiments, this local memory may be coupled to the processor by the second set of busses described previously. This architecture increases memory access speed and reduces the need to interact with a coherency controller for each memory access from the processor. At least a portion of the processor's address space may then be mapped to this directly connected memory. Since the directly connected memory may be a non-hardened, commercial grade memory, it may benefit from higher densities and higher speeds available in the commercial market place. In some embodiments, the directly connected local memory is not specifically designed to be hardened against the radiation effects of outer space, and thus may also be susceptible to SEUs. In this embodiment, the system would also check for coherency of the memory along with checking coherency of the processors.

In one implementation, each processor within a computing module includes a hashing module that has instructions which configure the processor to generate a hash value from the processor state data, the local memory, or a combination of the two. Because the memory space within each computing module may be relatively large, the memory space may be divided into predetermined segments or portions, and the hashing module configured to only create a hash value from a particular segment or portion of the memory. The same memory portion from the local memories in each computing module would then be hashed by the hashing module to create a hash value that could be comparable across multiple computing modules.

In some embodiments, the system creates hash values at regular temporal intervals during operation of the system. For example, the system uses a timer so that every 1, 2, 5, 10, 20, 30 or more milliseconds the system starts a check to ensure that the hash values from the memory or processor state data from each computing module match with one another. Because the local memory may be a relatively large amount of data to hash, in some embodiments, the system uses a process of sequentially interrogating the entire memory space of the local memory from each computing module, by creating hash values for different portions of the memory at each sequential temporal interval. In this embodiment the system divides the memory into portions or segments, and at a time of t=1, creates and compares a hash value of the first memory portion from each computing module. Then at time t=2 the system creates and compares a hash value of the second memory portion from each computing module, and so on until the entire local memory space of each processor is interrogated. This allows the system to check for memory consistency every few milliseconds because the process of creating a hash of the relatively smaller memory portions is not as computationally intensive as if the entire memory was being hashed.

In some implementations, after the hashes are created by each processor, the hashes are communicated to a fault tolerant checking unit. The fault tolerant checking unit may be implemented as a specialized Application Specific Integrated Circuit (ASIC) or Field Programmable Gate Array (FPGA), or other programmable logic device. If the fault tolerant checking unit determines that the hashes do not match, the fault tolerant checking unit may identify a majority hash and a minority hash. A majority hash may be a hash produced by a majority of the computing modules, and a minority hash may be a hash produced by a minority or one of the computing modules.

In implementations that hash only a portion of a memory with each temporal interval as described earlier, other portions of the memory for each computing module may be hashed in response to detection of non matching memory hashes between the computing modules. Hashes of each memory portion for each computing module may then be compared to identify any additional memory portions that may have errors. This design acknowledges that a memory corruption in one portion of a memory may indicate an increased likelihood of memory corruption in other portions of the memory.

In some other implementations, a processor executing instructions included in the hashing module may generate a hash that combines processor state data with a portion of local memory state data. In some implementations, the portion of the memory that is included in the hash may be varied with each hash generation.

In some implementations, each processor's address space may also be mapped to address and data lines controlled by the fault tolerant checking unit. Other implementations may couple a separate bus to a fault tolerant checking unit. The fault tolerant checking unit can determine if one or more of the processors is yielding an output that is different from a majority of the processors to detect an error. Upon detection, the error may be logged, and the operation of the processor that generated the error may be suspended. In some implementations, the processor may be allowed to continue operation when an error is detected. Whether the processor is suspended or allowed to continue operation may depend on the nature of the error.

In some implementations, a processing module may become unresponsive. For example, it may stop signaling the address and data lines controlled by the fault tolerant checking unit, or it may stop producing hashes of its processor state data or memory state data. Under these circumstances, means may be provided to cause the processor to be reset. For example, the fault tolerant checking module may be operatively coupled to the processor's reset signaling line. When a processor is reset, its processor state data and memory state data may be reinitialized with the processor state data and memory state data from another processing module.

Some implementations have one or more of the following potential advantages. Because the disclosed methods, apparatus, and systems may make use of commercially available memory modules, a larger memory size may be provided for each computing module while maintaining cost parameters. This increased memory size may enable faster or more powerful capabilities. For example, more powerful software with enhanced capabilities may be stored within the larger available memory. Alternatively, the increased memory may be used to increase cache sizes, providing faster access to data and/or code. Second, the system may be architected such that most data access is via the higher speed directly connected memory, and not the slower, hardened memory modules accessible via the coherency controller. Thus, memory access speeds may be generally improved, further increasing performance.

FIG. 1 illustrates a block diagram of a satellite 100 that includes a fault tolerant processing system 110 to control various functions of the satellite 100. For example, the fault tolerant processing system 110 is connected to a thruster control module 115 that oversees the operation of the satellite thrusters. In addition, the fault tolerant processing system 110 is connected to a solar array deployment module 120 that includes programming to control the deployment and positioning of the solar array on the satellite. A communication module 125 may also be connected to the fault tolerant processing system 110 to provide communication channels between the satellite 100 and a ground station. By using the fault tolerant computer system 110, the satellite 100 is provided with a system that is robust and resistant to SEUs that may otherwise affect the guidance or control of the satellite 100. The satellite 100 may also include other processing modules not illustrated in FIG. 1 for maintaining a robust computing environment for the satellite 100.

Figure 2:
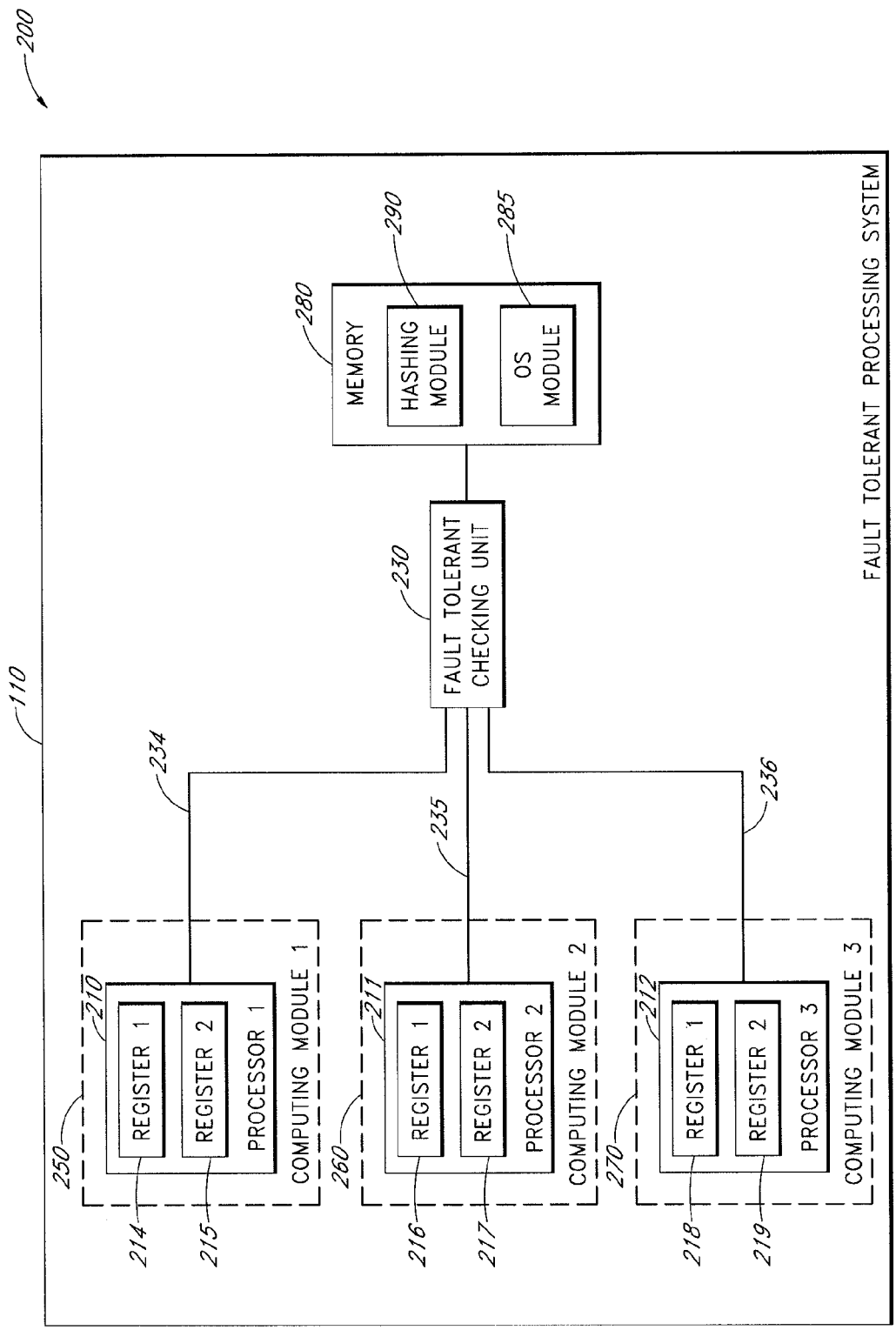
FIG. 2 illustrates a block diagram of one embodiment of a fault tolerant processing system having multiple processors.

FIG. 2 illustrates a block diagram of the fault tolerant processing system 110 shown in FIG. 1. The system includes three separate computing modules 250, 260 and 270. Each computing module includes a processor. For example, computing module 1 250 includes processor 210, computing module 2 260 includes processor 211, and computing module 3 270 includes processor 212. As shown each processor includes two internal registers. For example, processor 220 includes registers 214 and 215. Similarly, processor 211 includes registers 216 and 217, and processor 212 includes registers 218 and 219.

Accessible to each processor is a memory 280. Memory 280 is accessible via fault tolerant checking unit 230 (described below). Each processor may execute instructions stored in a memory 280. In one implementation, those instructions may be organized into an operating system module 285 and a hashing module 290. Each processor may read instructions included in operating system module 285 or hashing module 290. Those instructions may configure the processors to perform functions. For example, hashing module 290 may configure processors 210, 211, and 212 to perform a hash of at least a portion of the processor state data for its corresponding processor. For example, instructions in hashing module 290 may configure processor 210 to read the state data stored in the registers 214 or 215 for the processor 210 and create a hash of that state data. Therefore, instructions within hashing module 290 executing on each of processors 215, 217, and 219 represent one means for hashing configured to generate hash values for a plurality of processors state data. As will be described in more detail below, by having each processor provide hashed state data for comparison, the fault tolerant processing system 110 may quickly and efficiently compare the states of each processor in the system to determine if any faults have occurred.

As shown in FIG. 2, the three processors 210, 211, and 212 are operatively coupled to a fault tolerant checking unit 230, via links 234, 235, and 236. Fault tolerant checking unit 230 is configured to compare the hashes generated by processors 210, 211, and 212 when they execute instructions included in hashing module 290. For example, fault tolerant checking unit 230 may determine whether the three hashes generated by processors 210, 211, and 212 are equal at a periodic interval. If the hashes are not equal, the fault tolerant checking unit 230 may then determine if at least a majority of the hashes are equal. Therefore, fault tolerant checking unit 230 represents one means for comparing a plurality of hash values. This process of comparing hash values will be described in more detail below.

As is known, creating a hash relates to a deterministic procedure that may receive variable sized input data and output other data of a fixed size. When processor state data is used as input to a hash function, any small change in the processor state data will result in a large and detectable change in the resultant hash value of that state data. In one implementation, the hash returned by the processors when executing instructions stored in hashing module 290 is used to determine if the state of each processor is the same and in synch with the other processors.

One well known hash function is known as the Secure Hash Algorithm or "SHA" and was designed by the National Security Agency. One variant, SHA-1 is a cryptographic hash function published by the NIST as a U.S. Federal Information Processing Standard. SHA-1 produces a 160-bit hash value. Because the data within each hash value is substantially smaller than the data in the entire state data from each processor, the disclosed embodiment that compares hash values for each set of processor state data is more efficient than comparing the actual state data.

The fault tolerant checking unit 230 may be further configured to re-synchronize computing modules 250, 260, and 270 when it determines that the three hashes generated by processors 210, 211, and 212 are not equal. Therefore, fault tolerant checking unit 230 represents on means for determining if a processor within each computing module is synchronized with the processors of the other computing modules. For example, fault tolerant checking unit may re-synchronize the computing modules 250, 260, and 270 when one, two or all three of the hashes do not match each other. In one embodiment, re-synchronizing a computing module includes restoring the processing state of the computing module that produced a minority hash.

In some embodiments, the processing state of a computing module that produced a minority hash may be restored based on the processing state of a computing module that produced a majority hash. For example, if computing modules 250 and 260 produced the same hash value, and computing module 270 produced a different hash value, then computing module 270 produced the minority hash and computing modules 250 and 260 produced a majority hash. In this circumstance, the state value of processor 210 in majority computing module 250 may be used to restore the state value of processor 212 in minority computing module 270. Alternatively, the state value of processor 211 in majority computing module 260 may also be used to restore the state value of processor 212 in minority computing module 270.

Fault tolerant checking unit 230 may also be configured to compare the outputs of computing modules 250, 260, and 270. For example, lines 234, 235, and 236 may include address lines and data lines asserted by processors 210, 211, and 212. Fault tolerant checking unit 230 may compare the address and data lines from computing modules 250, 260, and 270, and determine if corresponding lines between the three computing modules are asserting equivalent signals. This comparison may occur on every bus cycle for address lines and data lines 234, 235, and 236.

Fault tolerant checking unit 230 may determine a majority output and an optional minority output based on the signals on lines 234, 235, and 236. Fault tolerant checking unit 230 may be configured to only pass majority signals on to other hardware components, for example, memory 280. While fault tolerant checking unit 230 is shown comparing the output signals from three computing modules 250, 260, and 270, which include three processors 210, 211, and 212, it should be understood that fault tolerant checking unit 230 could be configured to accept a larger number of inputs. For example, a fault tolerant checking unit 230 could compare the output from 5, 7, 9, or 11 processors to determine a majority and an optional minority output signal.

As shown in FIG. 2, the fault tolerant checking unit 230 is connected to a main memory 280 which is used by the fault tolerant processing system 110 for storing data, instructions and programs used by the system 110. In addition, memory 280 may include instructions that configure the processors 210, 211, and 212, for example, by reading data from an operating system module 285 stored within the memory 280 and loading that operating system onto one or more of the processors during a restore process.

Of course it should be realized that each processor as shown in FIG. 2 may be a single processor device, or a core of one multi-processor device. For example, the fault tolerant processing system may include a plurality of separate processors, such as those made by INTEL or AMD. Conversely, each processor may be a single core of a multi-core processor make by INTEL or AMD that functions as described above. In some embodiments, a mixture of single or multi-processor devices may be used as the processors in the system 110.

Figure 3:
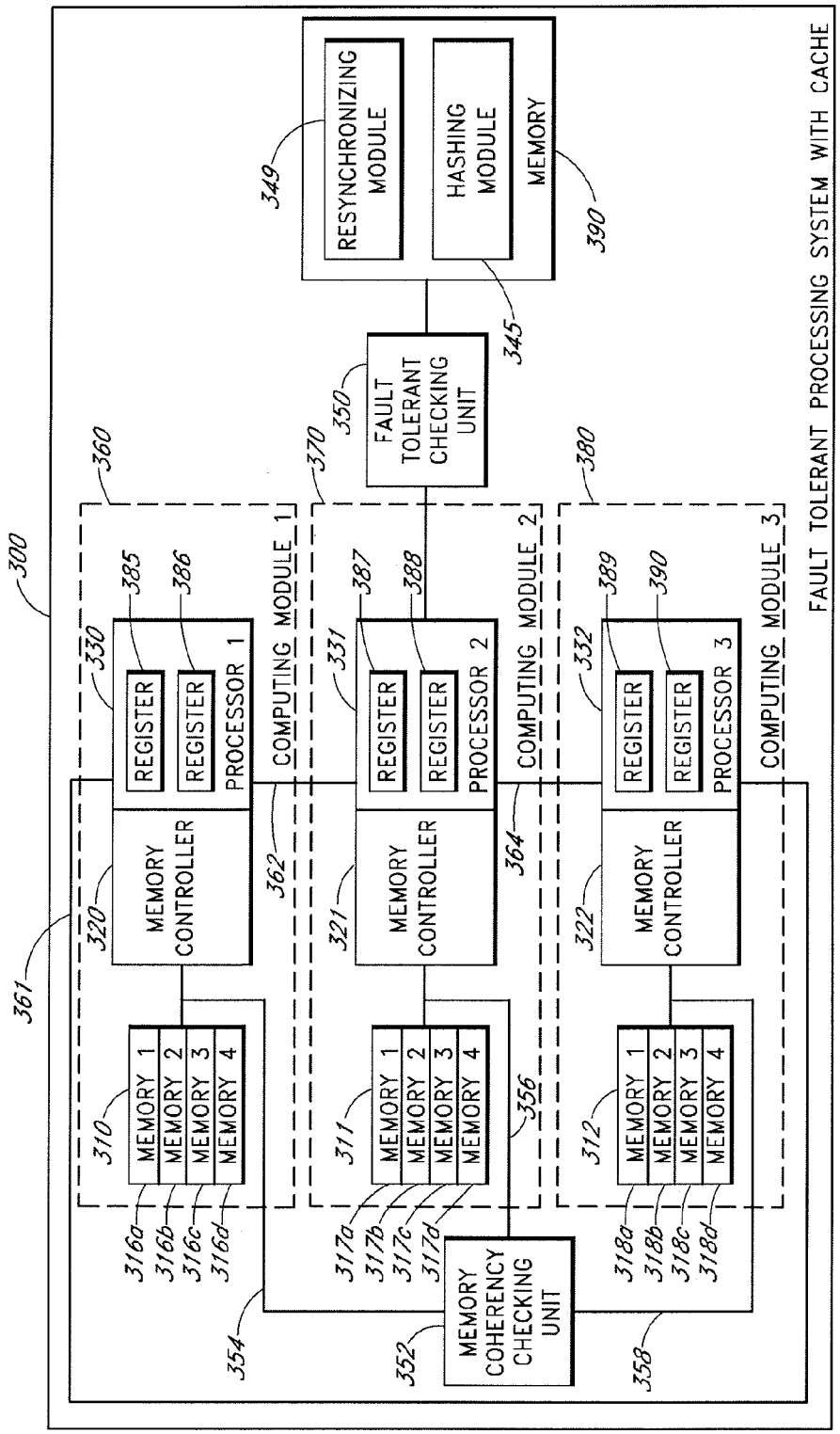
FIG. 3 illustrates a block diagram of a second embodiment of an exemplary fault tolerant processing system.

FIG. 3 illustrates another embodiment of a fault tolerant processing system 300, but this embodiment differs from the embodiment shown in FIG. 2 by the use of separate memory banks linked to each processor. As shown, the system 300 includes three computing modules 360, 370, and 380. Each computing module includes at least one processor. For example, computing module 360 includes processor 330, while computing module 370 includes processor 331 and computing module 380 includes processor 332.

Each processor includes internal registers for storing processor state information. For example, processor 330 includes internal registers 385 and 386. Processor 331 includes internal registers 387 and 388, and processor 332 includes internal registers 389 and 390. Each processor also includes a memory controller associated with the processor and for controlling access to a local memory storage. In one embodiment, the local memory storage is cache memory. For example, processor 330 includes memory controller 320 for managing access to local memory 310. Similarly, memory controller 321 of processor 331 manages access to local memory 311, and memory controller 322 of processor 332 manages access to local memory 312.

It should be realized that each local memory may be partitioned into a plurality of memory segments. For example, local memory 312 of computing module 380 is partitioned into four memory segments in the illustrated example. These memory segments are identified as items 318a-d.

It should also be realized that the local memory may be stored external to the processor, or as integrated memory stored on the processor die. In some embodiments, the local memory is fast access cache memory, and the memory segments are cache memory segments. In other embodiments, the local memory is standard random access memory and configured to store program data in addition to data specific for a particular processor.

Similar to the embodiment described for FIG. 2, each computing module may execute instructions included in a hashing module 345. Instructions in hashing module 345 may configure the processors to calculate a hash value from the state data stored in the processor registers. While hashing module 345 is illustrated as being stored in memory 390, which is accessible to computing modules 360, 370, and 380 via the fault tolerant checking unit 350, hashing module 345 may instead be stored in local memories 310, 311, and 312. These local memories may provide faster access to code segments, such as those provided by hashing module 345. In other embodiments, copies of hashing module 345 may be stored in memory 390 and local memories 310, 311, and 312.

In some embodiments, the hashing module 345 configures the processors to create a hash that also includes data from the local memory associated with each processor. For example, when instructions included in hashing module 345 are executed by processor 330, processor 330 may create a hash to represent the state of processor 330 and local memory 310. Similarly, when instructions in hashing module 345 are executed by processor 331, processor 331 may create a hash to represent the state of processor 331 and local memory 311. When instructions in hashing module 345 are executed by processor 332, processor 332 may create a hash to represent the state of processor 332 and local memory 312. Therefore, instructions included in hashing module 345 running on each of processors 330, 331, and 332 may represent one means for hashing configured to generate hash values for the processor state data of a plurality of computing modules.

As discussed above, a hash operation may include any operation that uniquely maps a large data set to a smaller data set. For example, a hash may map multiple bytes that comprise processing state data stored in registers 385 and 386 into a four byte quantity. A hash may further map both a processing state and a memory state into a smaller data set, such as a four byte quantity. For example, a hash may map the contents of processing state stored in registers 385 and 386, along with the contents of at least a portion of local memory 310, into a four byte quantity. In some implementations, a hash may be a checksum produced by the SHA-1 hash algorithm.

Instructions within hashing module 345 may further configure processors 330, 331 and 332 to vary the memory state data used to create a hash. For example, when instructions within hashing module 345 run within computing module 1 on processor 330, a first hash may map processing state registers 385 and 386, along with memory state data from memory segment 316a, into a hash. In one example, the hash is a four byte hash. When a second hash is produced with processor 330, hashing module 345 may map processing state registers 385 and 386, along with memory segment 316b into a hash, for example, another four byte quantity. After hashing module 345 running on processor 330 has included all segments of memory 310 in a hash, instructions within hashing module 345 may configure processor 330 to return to memory segment 316a and repeat the cycle. Therefore, instructions within hashing module 345, running on processors 330, 331, or 332, represent means for hashing combined processor state data and memory state data for each computing module.

In some implementations, hashing module 345 may not include instructions that configure processors 330, 331, and 332 to create hashes for local memories 310, 311, and 312 as described above. In these embodiments, a separate memory coherency checking unit 352 may be provided. Memory coherency checking unit 352 may be configured to monitor the address, data and control lines between processors and their respective local memories. As shown, memory coherency checking unit 352 is configured to monitor the lines between processor 330 and local memory 310 via lines 354. Memory coherency checking unit 352 may also monitor address, data, and control lines between processor 331 and memory 311 via lines 356, and processor 332 and memory 312 via lines 358. By monitoring these address, data, and control lines, memory coherency checking unit 352 may be configured to detect errors in memories 310, 311, and 312 by identifying inconsistencies between data from the memories. Memory coherency checking unit may be further configured to signal fault tolerant checking unit 350 via separate signaling lines (not shown) upon detection of such an error condition.

In some other embodiments, both a memory coherency checking unit 352 and a hashing module 345 may be utilized. For example, some of these embodiments may begin a re-synchronization process based on an error detected by memory coherency checking unit 352. The re-synchronization process may itself be synchronized between the processing modules, as the minority and majority processing modules may have departed from lockstep operation. This synchronization may be based on an event or particular time period elapsing after initiation of a re-synchronization. To coordinate the re-synchronization process between processing modules, hashing module 345 may configure the processors to hash portions of processor state data or memory state data. These hashes may be used by fault tolerant checking unit 350 to identify differences in these states between processing modules. This information may assist processing modules 360, 370, and 380 to return to lockstep operation.

In still other embodiments, the system 300 may include Direct Memory Access (DMA) capabilities. These DMA capabilities may provide an ability to read and write to locations of local memories 310, 311, and 312, without loading each word of memory processed into processors 330, 331, and 332. This may enable data collection from the memories for hash calculation to occur substantially in parallel with the operation of processors 330, 331, and 332. In some embodiments, processors 330, 331, and 332 may include integrated DMA capabilities.

Some embodiments may provide for additional hardware components to control the hashing process. In some of these embodiments, dedicated hardware processors or components may control a DMA process that reads data from the memories. This data may be used to create hashes. Some of these embodiments may also retrieve processor state data from processors 330, 331, and 332 using specialized hardware components. These hardware components may then calculate hashes as appropriate based on the collected data and send the hash information to fault tolerant checking unit 350. These embodiments may provide improved performance compared to embodiments that utilize existing processor capacity to periodically calculate hashes. These embodiments may also provide for increased cost.

Each processor 330, 331, and 332, when running hashing module 345 may create hashes as described above for its respective computing module. The hashes from each processor may then be passed to a fault tolerant checking unit 350. In one embodiment, fault tolerant checking unit 350 is configured to compare the hashes generated by processors 330, 331 and 332 to determine a majority hash and an optional minority hash. Fault tolerant checking unit 350 may initiate a re-synchronization of computing modules 360, 370, and 380 when the hashes provided by processors 330, 331, and 332 differ. A fault tolerant checking module 350 may represent one means for determining if the processor within each computing module is synchronized with the processor of the other computing modules.

The fault tolerant checking unit 350 may initiate a re-synchronization by sending a signal to a re-synchronizing module 349 running on each processor 330, 331, and 332. Re-synchronizing module 349 includes instructions that configure each processor to perform a re-synchronization. Re-synchronization module 349 may be stored as part of a memory 390.

The re-synchronizing of computing modules 360, 370, and 380 may be controlled by instructions located in the re-synchronization module 349 of FIG. 3. A fault tolerant checking unit 350 along with instructions within a re-synchronization module running on each of processors 330, 331, and 332 represent one means for re-synchronizing a computing module based on the hashes created by processors 330, 331, and 332.

Re-synchronization module 349 may include instructions that configure each of processors 330, 331, and 332 to update processing state data or memory state data of a computing module that produced a minority hash. In some embodiments, the processing state of a computing module that produced a minority hash may be updated based on the processing state of a computing module that produced a majority hash. For example, if computing modules 360 and 370 produced the same hash value, and computing module 380 produced a different hash value, then computing module 380 produced the minority hash and processors 360 and 370 produced a majority hash. In this example, the processing state data and or state data of computing module 380 may be updated based on the processing state data and memory state data of either computing module 360 or computing module 370.

When producing a minority hash, computing module 380 may receive new state from either computing module 360 or computing module 370. For example, computing module 380 may receive new state for registers 389 and 390 from computing module 360. The new state may be received from registers 385 and 386 of processor 330. The new state may be transmitted directly from computing module 360 to computing module 380 via a link 361 that connects the processors 330, 331 and 332. In some implementations, the link 361 may be a PCI Express bus or other high speed bus with a direct connection to each processor of the system 300.

The new state data received from either computing module 360 or computing module 370 may also include memory state data. For example, computing module 380 may receive new memory state data for portions or all of memory 312 from computing module 360. The new memory state data may be received from memory 310. For example, one or more of memory segments 316a-d may be transferred over link 361 to computing module 380. Computing module 380 may then replace the contents of memory 312 with the memory state data received from computing module 360. For example, computing module 380 may replace the memory state data for one or more memory segments 318a-d when receiving corresponding one or more memory segments 316a-d from computing module 360.

Before a re-synchronization is complete, there is a probability that a majority computing module may experience a SEU. This may result in the transfer of incorrect processor state data or memory state data to the minority computing module. This error scenario may cause the multiple computing modules to generate inequivalent results after the re-synchronization is complete. However, if the SEU occurred in state data before it was transferred from a majority computing module to a minority computing module, a majority computing module and the minority computing module may generate equivalent but incorrect results after the re-synchronization is complete. Because these two units may form a majority, for example in embodiments utilizing only three computing modules, these incorrect outputs may be accepted as a majority output unless additional protections are provided.

To avoid this scenario, some embodiments may perform an additional verification after a resynchronization process is complete. For example, these embodiments may perform an additional partial re-synchronization to determine whether the hashes generated by the processing modules match. If the computing modules that formed a majority during the preceding re-synchronization do not generate matching hashes, recovery steps may be appropriate. Alternatively, if the hash of the minority computing module does not match the hash of a majority computing module from which the minority computing module did not receive state during the previous resynchronization, recovery steps may also be appropriate. For example, an error may be flagged as a result of the comparison of these hashes. A reboot of the fault tolerant processing system board may be performed as a result of the error. While this may disrupt operations, it may return the system to verifiably correct operation.

When state data is transferred between processor 330 and processor 331, a link 362 may be utilized that directly connects these processors together. Similarly, when new state data is transferred between processor 331 and processor 332, a link 364 may be utilized that directly connects these two processors together.

Each processor may also have access to the memory bank 390 via the fault tolerant checking unit 350. For example, each processor may access memory 390 after a coherency check of the outputs of the processors, as described earlier with respect to FIG. 2, is performed by the fault tolerant checking unit 350. Local memories 310, 311, and 312, or memories accessible via fault tolerant checking unit 350, such as memory 390, may store instructions that configure processors 330, 331, and 332 to perform functions. For example, processors 330, 331, and 332 may read memory locations in memory 390 via fault tolerant checking unit 350. Memory 390 may include instructions that configure processors 330, 331 and 332. Memory 390 may also include instructions for an operating system (not shown), or the re-synchronization module 349. Alternatively, each processor 330, 331, and 332 may read instructions from the local memory within its respective computing module. For example, processor 330 may read instructions from local memory 310. Processor 331 may read instructions from memory 311 and processor 332 may read instructions from local memory 312.

Figure 4:
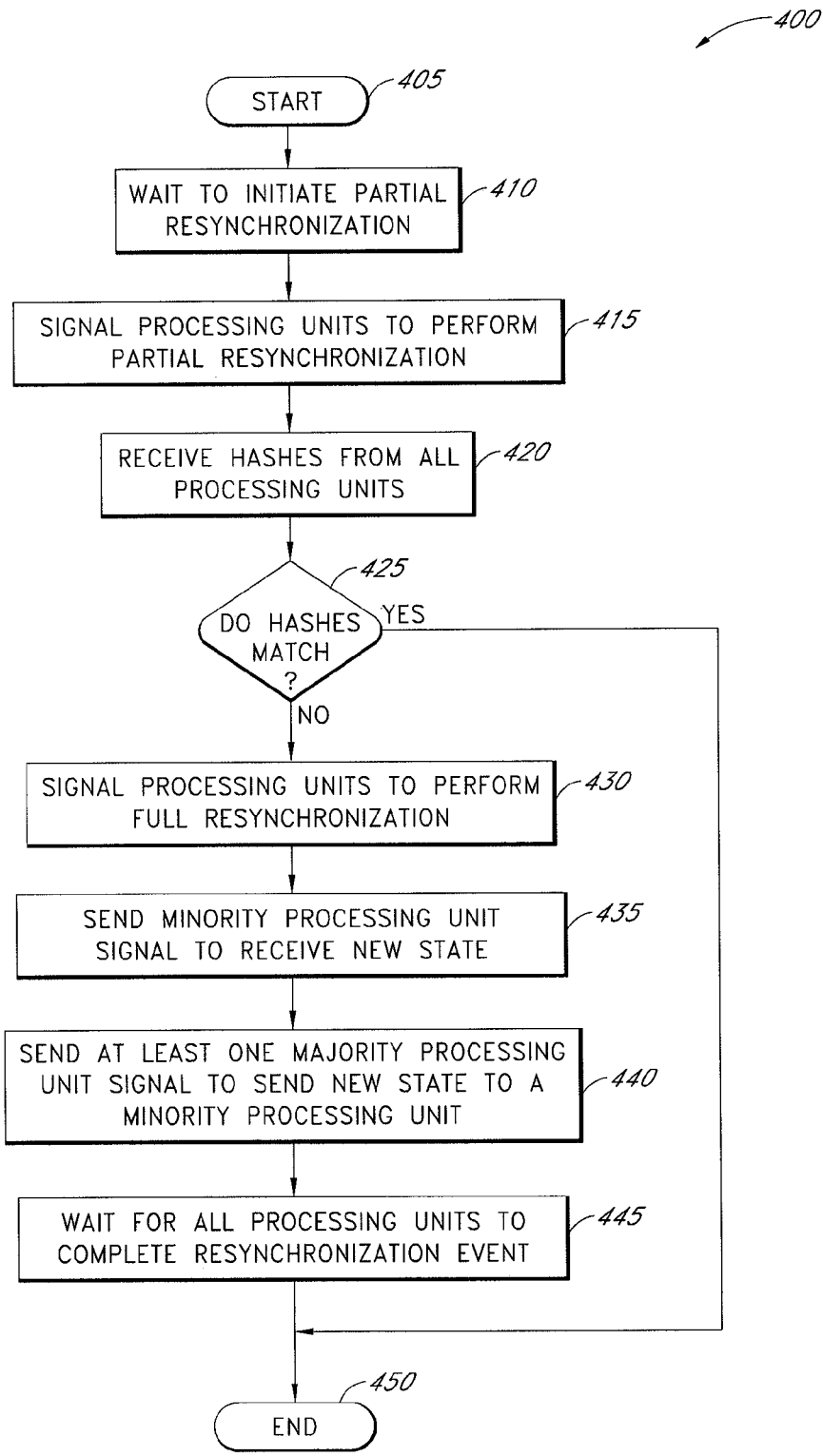
FIG. 4 is a flow chart illustrating an exemplary process for verifying the hashes on a plurality of computing modules.

FIG. 4 is a flow chart illustrating an exemplary process 400 that may run in a fault tolerant checking unit to compare hashes received from a plurality of computing modules. In some implementations, process 400 may be implemented by instructions within fault tolerant checking unit 350 of FIG. 3, or fault tolerant checking unit 230 of FIG. 2. The process 400 begins at start block 405 and then moves to processing block 410, where process 400 waits to initiate a partial re-synchronization. In some implementations, a partial re-synchronization of the processors may be performed periodically to ensure that each processor is in synchronization with the other processors in the system. Some embodiments may perform a partial resynchronization every 1, 2, 5, 10, 20 or more milliseconds.

Once process 400 determines it is time to perform a partial re-synchronization, process 400 moves to processing block 415, where the processors are signaled to perform a partial re-synchronization. Upon receiving a partial re-synchronization signal, the processors may hash their processing state data or their memory state data. Partial re-synchronization is described in FIG. 5 below. Process 400 then moves to processing block 420, where hashes are received from all processing modules. Process 400 then moves to decision block 425, where the hashes are evaluated to determine whether they all equivalent. In some implementations, the hashes may include separate hashes of both processor state data and memory state data of each computing module. Some implementations may combine hashes of processing state data and memory state data into a single hash value. In some implementations, the portion of the hash that represents memory state data may represent only a portion of a computing modules memory state data. Other implementations may include a representation of all of the computing modules memory state data in the hash.

If the hashes are equivalent, the process 400 moves to end block 450 and the process 400 terminates. If all of the hashes do not match, there may be a minority hash and at least two majority hashes. Process 400 then moves from decision block 425 to processing block 430 where the processing modules are signaled to perform a full re-synchronization.

A full re-synchronization will synchronize the processor state data or memory state data for a computing module that generated a minority hash with the state data of a computing module that generated a majority hash. The re-synchronization process is described in FIG. 6 below. Process 400 then moves to block 435, where process 400 sends a signal to the minority computing modules indicating that they will be receiving new state. Process 400 then moves to processing block 440, where process 400 sends a signal to at least one majority computing module instructing the majority computing module that it should send new state to the minority computing module. Process 400 then moves to block 445, where it waits for all computing modules to complete the re-synchronization. Process 400 then moves to end state 450.

Figure 5:
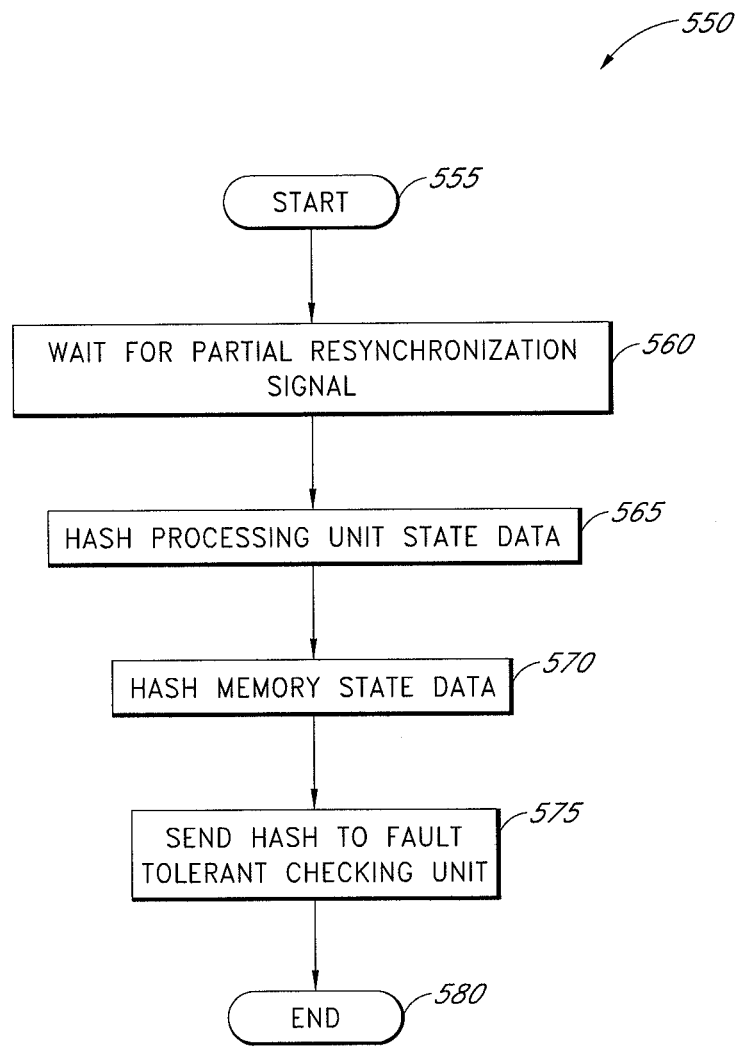
FIG. 5 shows a flowchart of an exemplary hashing process.

FIG. 5 shows a flowchart of an exemplary hashing process. In some implementations, process 500 may be implemented by instructions included in hashing module 290 of FIG. 2. Alternatively, process 500 may be implemented by instructions included in hashing module 345 of FIG. 3. Process 550 begins at start state 555 and then moves to block 560, where it waits for a partial re-synchronization signal. The partial re-synchronization signal may be sent by process 400, as discussed previously. When a partial re-synchronization signal is received, process 550 moves to processing block 565, where the processor state data is hashed. To implement block 565, processor 330 of computing module 360 may be configured by instructions included in hashing module 345 to hash its processor states 385 and 386. Process 550 then moves to processing block 570, where memory state data is hashed. To implement block 570, processor 330 of computing module 360 may be configured by instructions included in hashing module 345, illustrated in FIG. 3, to hash one or more of memory portions 316*a-d*. Process 550 then moves to block 575, where the hash or hashes resulting from the combined hashing of the processor state data in block 565 and the memory state data in block 570 is sent to the fault tolerant checking unit. For example, processor 330 may send a hash to fault tolerant checking unit 350 to implement processing block 570. Process 550 then moves to end block 580.

Figure 6:
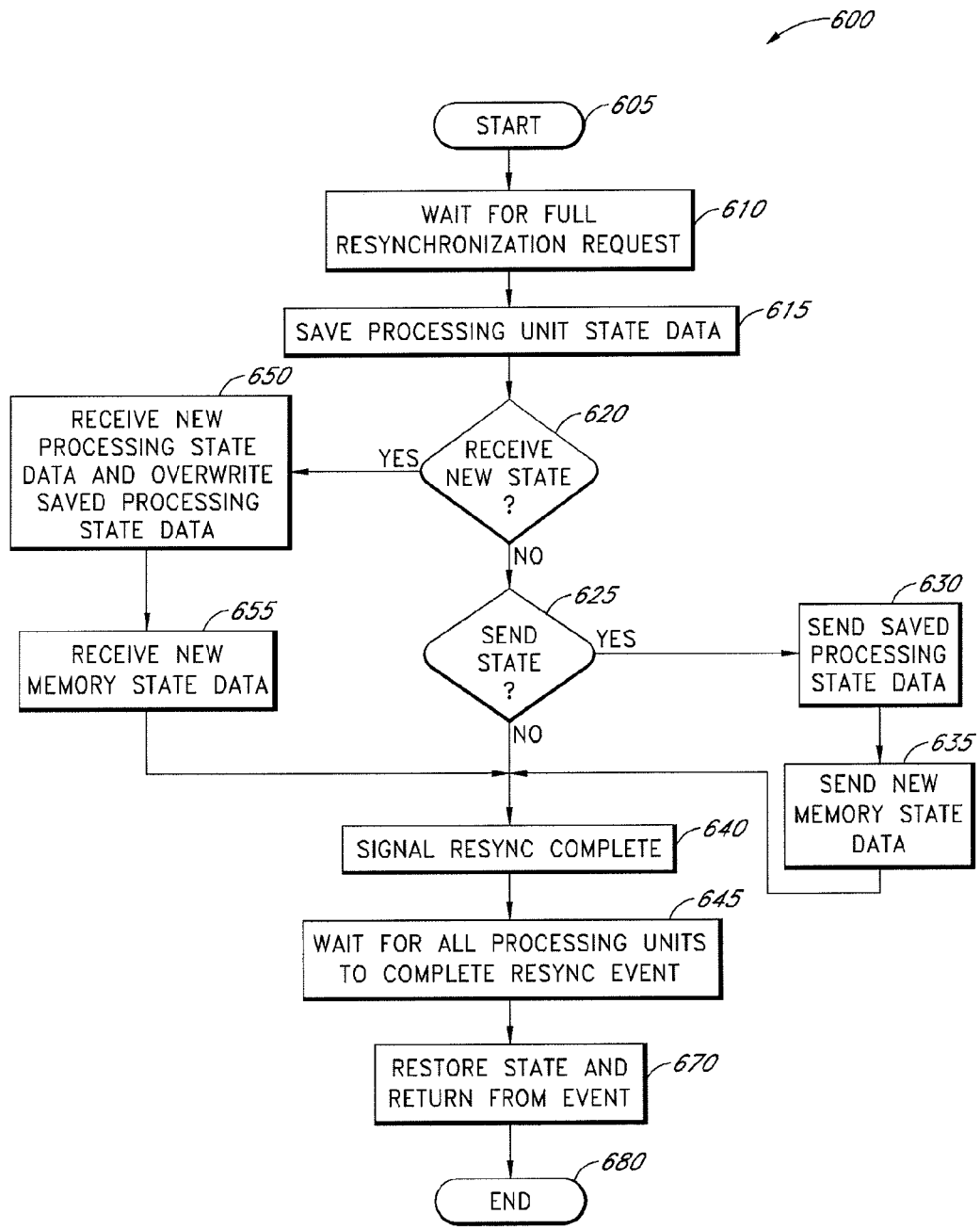
FIG. 6 shows a flowchart of an exemplary process that re-synchronizes a computing module.

FIG. 6 shows a flowchart of an exemplary process 600 that performs a full re-synchronization of a computing module. Process 600 may be implemented by instructions included in re-synchronization module 349, illustrated in FIG. 3. Alternatively, process 600 may be implemented by a re-synchronization module stored in a local memory, such as memory 310, illustrated in FIG. 3. These instructions may run on a processor within a computing module. For example, the instructions may run on processor 330 of computing module 360.

Process 600 begins at start block 605 and then moves to processing block 610, where process 600 waits for a full re-synchronization request. When a re-synchronization request is received, process 600 moves to block 615 where the processor state data is saved. For example, if processor 330 of computing module 360 receives a re-synchronization request, it may save registers 385 and 386 when implementing processing block 615 of process 600. Process 600 then moves to decision block 620, where it determines if it will receive new state. If it will receive new state, process 600 moves to block 650, where new processor state data is received. This new state data overwrites any data saved in processing block 615. Process 600 then moves to block 655, where new memory state data is received. In some implementations, this memory state may include the state of an entire local memory, for example, local memory 310, 311, or 312, illustrated in FIG. 3. In other implementations, this memory state may include only a portion of a local memory. For example, it may include only one memory segment, for example, memory segment 316*a*, 317*a*, or 318*a*, also illustrated in FIG. 3. After the memory state data is received, process 600 moves to processing block 640, where a signal is sent that the re-synchronization is complete.

Returning to decision block 620, if a new state will not be received by the computing module running process 600, process 600 moves to decision block 625, where it determines if state should be sent. If no state should be sent, process 600 moves to block 640 where it signals that its re-synchronization process is complete. If at decision block 625 it is determined that the processing module running process 600 should send state, process 600 moves to processing block 630, where the saved processor state data is sent. Process 600 then moves to processing block 635, where new memory state data is sent. The memory state data sent in block 635 may include a portion or all of a local memory. For example, it may include a portion of memory 310, for example, memory segment 316*a*. Alternatively, it may include two memory segments, for example, memory segments 316*a-b*. Still other implementations may send the entire memory 310, to include memory segments 316*a-d*. Process 600 then moves to processing block 640, where it signals that its portion of the re-synchronization is complete. After processing block 640, process 600 moves to block 645, where process 600 waits for all processing modules to complete their re-synchronization events. When all processing modules have signaled (via processing block 640) that their re-synchronization events are complete, process 600 moves to block 670 where the saved processing state data from processing block 615 is restored and process 600 returns from the event. Process 600 then moves to end block 680.

Figure 7:
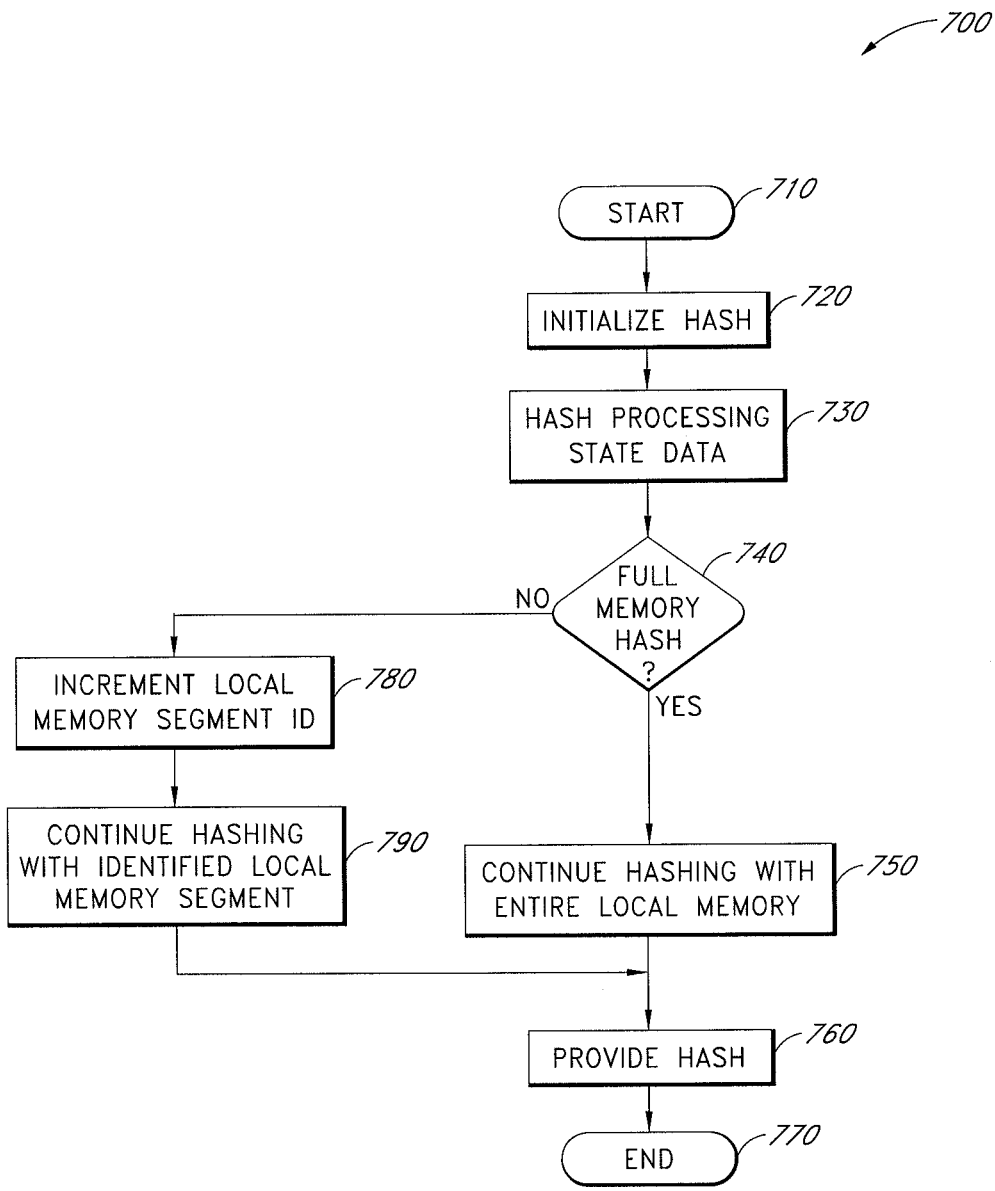
FIG. 7 shows a flowchart illustrating an exemplary implementation of a hashing method.

FIG. 7 shows a flowchart illustrating an exemplary implementation of a hashing method. Process 700 may be implemented by instructions included in hashing module 345 illustrated in FIG. 3. Process 700 begins at start block 710 and then moves to processing block 720, where a hash is initialized. Process 700 then moves to processing block 730, where the processing state data is hashed. For example, processor 330 may be configured by instructions in hashing module 345 to hash its processor states 385 and 386 to implement processing block 723. Process 700 then moves to decision block 740, where it determines whether a full memory hash will be performed or a partial memory hash will be performed. Process 700 moves to processing block 750 if a full memory hash will be performed. Processing block 750 may include the entire memory contents when determining the hash value. If decision block 740 determines that only a portion of the memory will be included in the hash, process 700 moves to processing block 780, where a local memory segment identifier is incremented. Process 700 then moves to block 790, where the hashing is continued with the memory segment identified by the segment identifier.

A local memory segment identifier may track a memory segment that should be included in the hash. For example, some implementations may vary the memory segment included in the hash for each partial re-synchronization. Some implementations may include the first memory segment in the first hash that is created. Each subsequent partial re-synchronization may include a different memory segment as part of the hash value. For example, the second partial re-synchronization may include a second memory segment, and a third partial re-synchronization may include a third memory segment. When all memory segments of a memory have been included as part of a partial resynchronization, the process 700 may again use the contents of the first memory segment in a hash. This incremental inclusion of different memory segments may then repeat.

After the identified memory segment has been included in the hash, process 700 moves to block 760, where the hash is provided. For example, the hash may be provided to fault tolerant checking unit 350, illustrated in FIG. 3. Process 700 then moves to end block 770.

Figure 8:
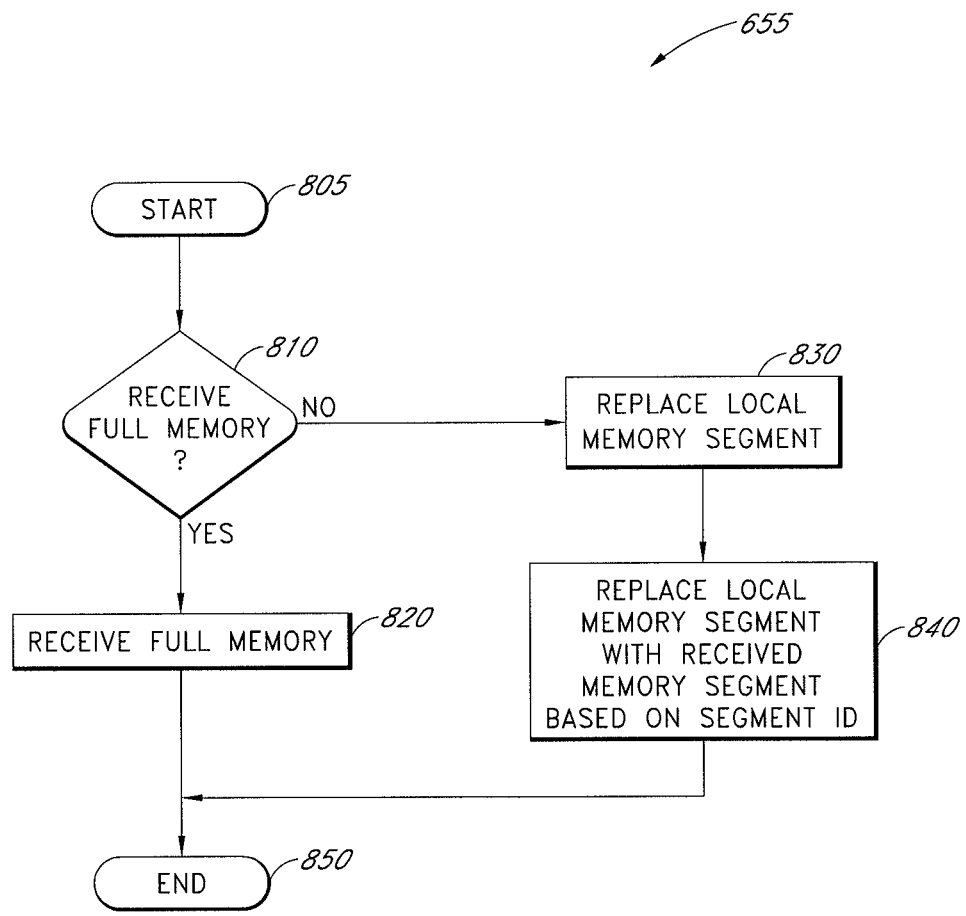
FIG. 8 shows a flowchart illustrating an exemplary receive memory process.

FIG. 8 shows a flowchart illustrating an exemplary receive memory process 655. Process 655 may be implemented by instructions included in re-synchronization module 349, illustrated in FIG. 3. Alternatively, process 655 may be implemented by instructions stored in local memories 310, 311 or 312, also illustrated in FIG. 3. Process 655 begins at start block 805 and then moves to decision block 810 where it determines whether the computing module running process 655 will be receiving a full memory image or a partial memory image. If receiving a full memory image, process 655 moves to processing block 820, where the full memory image is received. For example, computing module 360 may receive a memory image for local memory 310. This image may include new memory state data for each memory segment of local memory 310, to include memory segments 316a-d. Process 655 then moves to end block 850. Returning to decision block 810, it process 655 determines that only a partial memory image may be received, process 655 moves to block 830, where a memory segment is received. For example, computing module 360 may receive an image for a memory segment of local memory 310. For example, an image for only memory segment 316a may be received in processing block 830. Process 655 then moves to block 840, where the received local memory segment replaces a memory segment based on the segment id. The segment id referenced in block 840 may be the same segment id as that referenced in block 780 of process 700, illustrated in FIG. 7. Process 655 then moves to end block 850.

Figure 9:
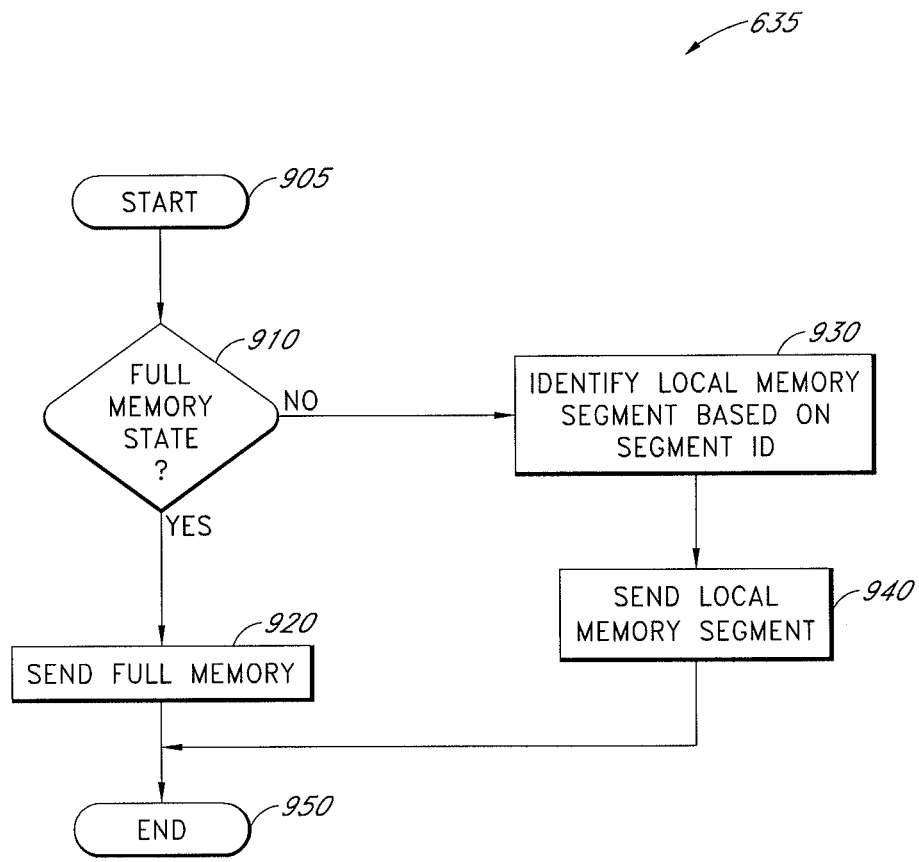
FIG. 9 shows a flowchart illustrating an exemplary memory sending process.

FIG. 9 shows a flowchart illustrating an exemplary memory sending process 635. Process 635 may be implemented by instructions included in re-synchronization module 349, illustrated in FIG. 3. Process 635 begins at start block 905 and then moves to decision block 910, where a determination is made whether a full memory state will be sent or a partial memory state will be sent. If a full memory state will be sent, process 635 moves to block 920 where the full memory state is sent. Process 635 then moves to end block 950. If a partial memory image will be sent, process 635 moves to block 935, where the memory segment is identified based on a segment identifier. The segment identifier referenced in block 930 may be the same identifier referenced in block 780, illustrated in FIG. 7. Process 635 then moves to block 940, where the memory segment identified by the segment identifier is sent. Process 635 then moves to end block 950.

Figure 10:
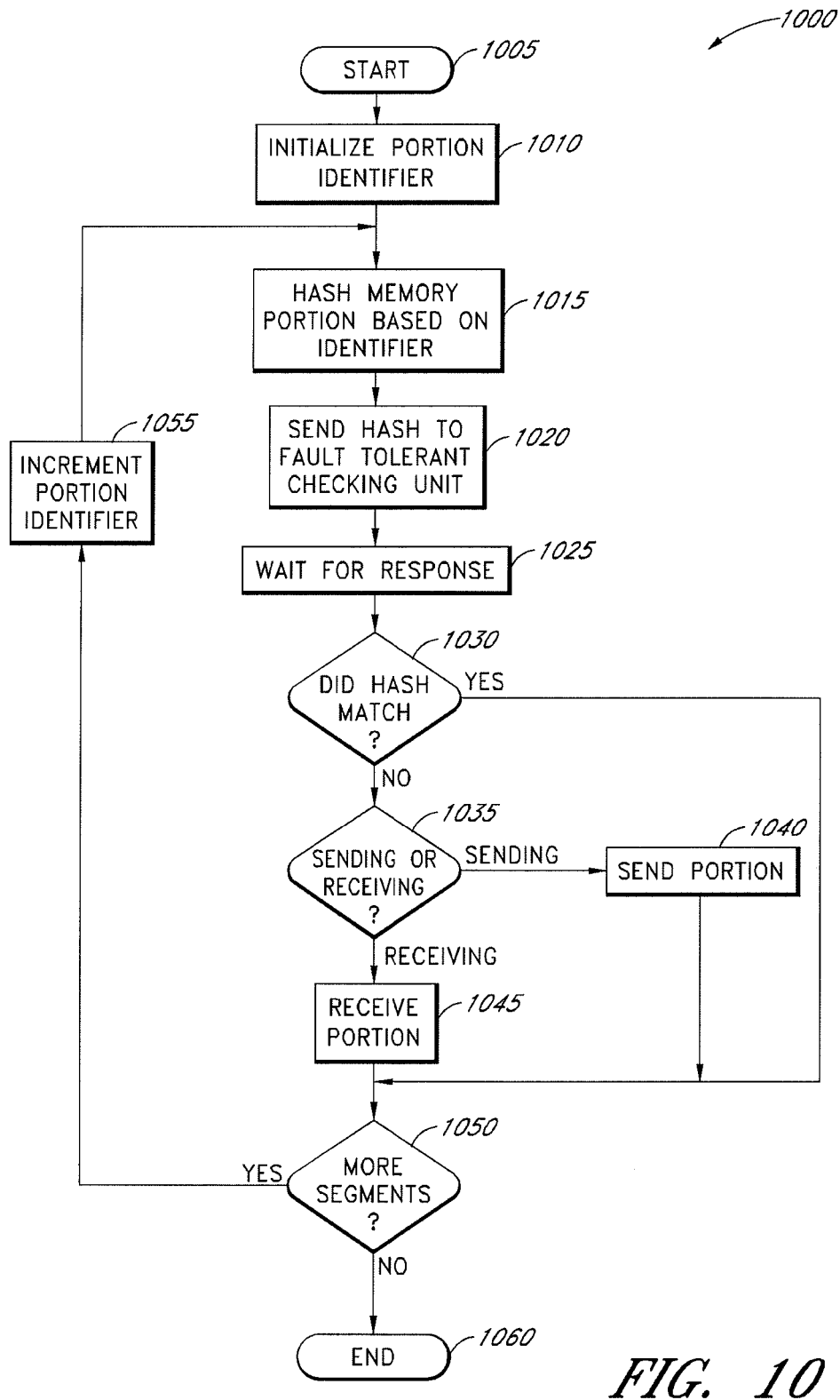
FIG. 10 shows a flowchart illustrating an exemplary memory synchronization process.

FIG. 10 shows a flowchart illustrating an exemplary memory sending and receiving process. Process 1000 may be an alternative implementation to processes 635 or 655, discussed previously. Process 1000 may be implemented by instructions included in hashing module 345 or re-synchronization module 349, of a combination of the two modules, illustrated in FIG. 3. Multiple processing modules, such as processing modules 360, 370, and 380, illustrated in FIG. 3, may perform process 1000 substantially simultaneously in order to coordinate a resynchronization of local memory contents between the processing modules.

Process 1000 begins at start block 1005 and then moves to block 1010 where a portion identifier is initialized. This portion identifier may be utilized to identify a portion of a memory, such as portions of local memories 310. 311. or 312. In some embodiments, a portion of a memory may be a memory segment. Process 1000 then moves to block 1015, where a portion of memory is hashed based on the identifier. Process 1000 then moves to block 1020, where the hash is sent to a fault tolerant checking unit, for example fault tolerant checking unit 350 of FIG. 3.

Process 1000 then moves to block 1025 and waits for a response. Process 1000 may be waiting for a response from a fault tolerant checking unit. For example, fault tolerant checking unit may compare hashes sent to it by computing modules 360, 370, and 380 performing process 1000. After a response is received, process 1000 moves to decision block 1030 where it is determined whether the received hashes match. For example, fault tolerant checking module 350 may send a response to a processing modules running process 1000, indicating whether the hash calculated in processing block 1015 matched hashes created by other processing modules, also running process 1000. If the hashes did match, process 1000 moves to decision block 1050.

If the hashes did not match, process 1000 moves to decision block 1035, where it determines whether this particular instance of process 1000 will be sending or receiving data. If the hashes did not match, one processing module may have created a minority hash. A processing module creating a minority hash and running process 1000 may receive a new portion of memory, so as to re-synchronize with the processing modules that created majority hashes. The minority processing module may move from decision block 1035 to block 1045. In block 1045, process 1000 may receive a new memory portion from another processing module, for example a processing module that created a majority hash.

Another computing module performing process 1000 may have created a majority hash. This processing module may determine in decision block 1035 that it will send a portion of memory to a processing module that created a minority hash. In this case, this processing module may move from decision block 1035 to block 1040.

After a portion of memory has been sent via block 1040 or received via block 1045, process 1000 moves to decision block 1050, where it determines whether there are additional memory portions that should be synchronized. If there are no remaining portions, process 1000 moves to end state 1060. If there are remaining portions, process 1000 moves to block 1055, where the memory portion identifier is incremented. Process 1000 then returns to block 1015 and the memory portion identified by the identifier incremented in block 1055 is hashed. Process 1000 then repeats as described above.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing modules, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of synchronizing the state of a plurality of computing modules in an electronic system, each computing module having a processor, comprising:
   saving at least a portion of processor state data for each of the plurality of computing modules;
   hashing at least the portion of the saved processor state data for each of the plurality of computing modules;
   comparing the processor hashes for the processor state data;
   determining a majority of computing modules having the same processor state data and at least one minority of computing modules having different processor state data;
   re-synchronizing the plurality of computing modules if the majority of computing modules are determined to have the same processor state data, and the minority of computing modules are determined to have different processor state data, wherein re-synchronizing comprises:
      sending the saved processor state data from a first majority computing module to a first minority computing module;
      confirming that the state data of a second majority computing module is the same as the saved state data from the first majority computing module or the saved state data of the first minority computing module after sending the saved processor state data from the first majority computing module to the minority computing module;

flagging an error if the state data is not the same; and restoring the processor state data of a majority computing module based on the majority computing module's saved processor state data in response to completion of the resynchronization.

2. The method of claim 1, further comprising:

hashing memory state data for each of the plurality of computing modules;

comparing the memory hashes for the memory state data; and re-synchronizing the plurality of computing modules based at least on the compared memory hashes.

3. The method of claim 1, wherein hashing the processor state data comprises calculating a checksum of the processor state data.

4. The method of claim 2, wherein hashing the memory state data comprises calculating a checksum of the memory state data.

5. The method of claim 1, wherein the re-synchronizing comprises sending processor state data from a first computing module to a second computing module.

6. The method of claim 5, wherein sending the processor state data comprises sending the processor state data over a data bus directly connecting the first computing module to the second computing module.

7. The method of claim 2, wherein hashing memory state data for each of the plurality of computing modules comprises hashing a portion of the memory state data for each of the plurality of computing modules.

8. The method of claim 2, wherein the method is performed at regular intervals during operation of the electronic system.

9. The method of claim 7, wherein during each regular interval, the method creates hash values for only a predetermined portion of the memory state data in each computing module.

10. The method of claim 9, wherein the memory state data is divided into at least a first memory portion and a second memory portion and during sequential regular intervals, the method hashes the first memory portion for each computing module and then hashes the second memory portion for each computing module.

11. The method of claim 10, wherein the method sequentially compares hash values for all of the memory state data over a plurality of sequential regular intervals.

12. The method of claim 1, wherein each of the computing modules comprises a processor core of a multi-core processor.

13. The method of claim 1, further comprising:

identifying a computing module that has become unresponsive; and resetting the unresponsive computing module.

14. The method of claim 9, the method further comprises:

during each regular interval:

determining whether the hash values of the predetermined portions of each computing module are equivalent, and creating additional hash values for a second portion of the memory state data in each computing module if the hash values of the predetermined portions are not equivalent.

15. A fault tolerant computing apparatus, comprising:

a plurality of computing modules, wherein each computing module comprises a hardware processor having processor state data;

a re-synchronization module configured to save at least a portion of processor state data for each of the plurality of computing modules;

a hashing module configured to generate hash values of at least the saved processor state data;

a fault tolerant checking unit configured to receive the plurality of hash values and re-synchronizing the plurality of computing modules if a majority of computing modules are determined to have the same processor state data, and a minority of computing modules are determined to have different processor state data, and wherein the re-synchronization module is further configured to:

send the saved processor state data from a first majority computing module to a first minority computing module;

confirm that the state data of a second majority computing module is the same as the saved state data from the first majority computing module or the saved state data of the first minority computing module after sending the saved processor state data from the first majority computing module to the minority computing module;

flag an error if the state data is not the same; and restore the processor state data of a majority computing module based on the majority computing module's saved processor state data in response to completion of the resynchronization.

16. The fault tolerant computing apparatus of claim 15, further comprising a memory coherency checking unit, configured to check the coherency of a plurality of memories included in the plurality of computing modules.

17. The fault tolerant computing apparatus of claim 15, wherein the processors of the plurality of computing modules each have memory state data, and the hashing module is further configured to generate hash values for the memory state data; and the plurality of hash values read by the fault tolerant checking unit include the hash values for the memory state data.

18. The fault tolerant computing apparatus of claim 17, wherein the hashing module is further configured to select only a predetermined portion of the memory to hash for each computing module.

19. The fault tolerant computing apparatus of claim 17, comprising a timer configured to start generating hash values of the memory state data at regular intervals.

20. The fault tolerant computing apparatus of claim 19, wherein the regular intervals are set to be at 2, 5, 10, 20 or 30 milliseconds.

21. The fault tolerant computing apparatus of claim 19, wherein the hashing module is configured to select only a portion of the memory from each computing module to hash at each regular interval.

22. The fault tolerant computing apparatus of claim 19, wherein the memory of each computing module has at least a first memory portion and a second memory portion and the hashing module is configured to sequentially hash the first memory portion and then the second memory portion from each computing module at sequential regular intervals.

23. The fault tolerant computing apparatus of claim 15, wherein each of the plurality of computing modules is operatively coupled to at least one other computing module in the plurality of computing modules by one or more buses.

24. The fault tolerant computing apparatus of claim 15, wherein the fault tolerant checking unit is further configured to identify a computing module that has become unresponsive, and reset the unresponsive computing module.

25. A fault tolerant computing apparatus, comprising:
a plurality of computing modules, wherein each computing module comprises a processor having processor state data;
means for saving at least a portion of processor state data for each of the plurality of computing modules;
means for hashing configured to generate hash values of at least the saved processor state data;
means for comparing the plurality of hash values;
means for determining a majority of computing modules having the same processor state data and at least one minority of computing modules having different processor state data; and
means for resynchronizing the plurality of computing modules based on the determining, wherein the means for resynchronizing is configured to:
send the saved processor state data from a first majority computing module to a first minority computing module;
confirm that the state data of a second majority computing module is the same as the saved state data from the first majority computing module or the saved state data of the first minority computing module after sending the saved processor state data from the first majority computing module to the minority computing module, and
flag an error if the state data is not the same; and
means for restoring the processor state data of a majority computing module based on the majority computing module's saved processor state data in response to completion of the resynchronization.

26. The fault tolerant computing apparatus of claim 25, wherein the means for comparing comprises a field programmable gate array (FPGA) programmed to compare hash values from the processor state data.

27. The fault tolerant computing apparatus of claim 25, wherein the means for comparing includes a fault tolerant checking unit.

28. The fault tolerant computing apparatus of claim 25, wherein the means for determining includes one or more re-synchronizing modules.

29. A non-transitory, computer readable storage medium having instructions stored thereon that cause a processing circuit to perform a method comprising:
saving at least a portion of processor state data for each of the plurality of computing modules;
hashing at least the saved processor state data for each of a plurality of computing modules;
comparing the processor hashes for the processor state data; and
determining a majority of computing modules having the same processor state data and at least one minority of computing modules having different processor state data;
re-synchronizing the plurality of computing modules based at least on the determining wherein re-synchronizing comprises:
sending processor state data from a first majority computing module to a first minority computing module;
confirming that the state data of a second majority computing module is the same as the saved state data from the first majority computing module or the saved state data of the first minority computing module after sending the saved processor state data from the first majority computing module to the minority computing module, and
flagging an error if the state data is not the same; and
restoring the processor state data of a majority computing module based on the majority computing module's saved processor state data in response to completion of the resynchronization.

30. The computer readable storage medium of claim 29, further including instructions that cause a processing circuit to:
hash memory state data for each of the plurality of computing modules;
compare the memory hashes for the memory state data; and
re-synchronize the plurality of computing modules based at least on the compared memory hashes.

* * * * *